US012236740B2

(12) United States Patent
Urban

(10) Patent No.: US 12,236,740 B2
(45) **Date of Patent: *Feb. 25, 2025**

(54) ELECTRONIC GAMING MACHINE INCLUDING HYBRID VIRTUAL AND PHYSICAL BUTTON AREA

(71) Applicant: Aristocrat Technologies, Inc., Las Vegas, NV (US)

(72) Inventor: Bruce Urban, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,535

(22) Filed: Jul. 11, 2023

(65) Prior Publication Data

US 2023/0351839 A1 Nov. 2, 2023

Related U.S. Application Data

(63) Continuation of application No. 17/573,437, filed on Jan. 11, 2022, now Pat. No. 11,734,990, which is a continuation of application No. 16/809,183, filed on Mar. 4, 2020, now Pat. No. 11,288,912.

(51) Int. Cl.
*G07F 17/32* (2006.01)
*G07F 17/34* (2006.01)

(52) U.S. Cl.
CPC ...... *G07F 17/3209* (2013.01); *G07F 17/3213* (2013.01); *G07F 17/3267* (2013.01); *G07F 17/34* (2013.01)

(58) Field of Classification Search
CPC ............ G07F 17/3209; G07F 17/3213; G07F 17/3267; G07F 17/34
See application file for complete search history.

(56) References Cited

U.S. PATENT DOCUMENTS

| | | | |
|---|---|---|---|
| 4,103,268 | A | 7/1978 | Anders |
| D327,508 | S | 6/1992 | Mirando |
| 5,226,067 | A | 7/1993 | Allred |
| 5,381,325 | A | 1/1995 | Messana |
| 5,709,056 | A | 1/1998 | Matsuyama |

(Continued)

OTHER PUBLICATIONS

"Button Deck Assembly for an Electronic Gaming Machine and Method for Making the Same", U.S. Appl. No. 18/579,290, filed Sep. 23, 2019.

(Continued)

*Primary Examiner* — Justin L Myhr
(74) *Attorney, Agent, or Firm* — Armstrong Teasdale LLP

(57) ABSTRACT

An electronic gaming machine is provided. The electronic gaming machine includes a game controller configured to execute at least one wagering game, a credit input device configured to receive a wager, a first display configured to prompt a user to select a wagering game from the at least one wagering game executable by the game controller, and a second display. The second display includes a hybrid display area including a touchscreen input component and a dynamic button deck assembly configured to receive player input during play of a user-selected wagering game. The dynamic button deck assembly includes a button deck display area and a dynamic button deck having at least one mechanical push button including a lens cap.

17 Claims, 12 Drawing Sheets

(56) References Cited

U.S. PATENT DOCUMENTS

| | | | | |
|---|---|---|---|---|
| D411,257 | S | 6/1999 | Nolte | |
| D417,145 | S | 11/1999 | McLaughlin | |
| 5,984,782 | A | 11/1999 | Inoue | |
| D424,122 | S | 5/2000 | Dickenson | |
| D428,062 | S | 7/2000 | Hayashi | |
| 6,186,894 | B1 * | 2/2001 | Mayeroff | G07F 17/34 463/16 |
| D451,148 | S | 11/2001 | Hedrick | |
| D451,153 | S | 11/2001 | Hedrick | |
| D459,402 | S | 6/2002 | Wurz | |
| D460,496 | S | 7/2002 | Cole | |
| 6,772,448 | B1 | 8/2004 | Hockaday | |
| D495,755 | S | 9/2004 | Wurz | |
| D508,269 | S | 8/2005 | Wichinsky | |
| 6,970,485 | B1 | 11/2005 | Kitayama | |
| D515,144 | S | 2/2006 | Boyd | |
| D525,665 | S | 7/2006 | Karlsson | |
| D535,338 | S | 1/2007 | Linard | |
| D549,785 | S | 8/2007 | Luciano, Jr | |
| RE40,625 | E | 1/2009 | Wurz | |
| D616,036 | S | 5/2010 | Cha | |
| D621,882 | S | 8/2010 | Williamson | |
| D622,781 | S | 8/2010 | Lesley | |
| D626,603 | S | 11/2010 | Bruzzese | |
| D632,342 | S | 2/2011 | Wen | |
| 7,892,096 | B2 | 2/2011 | Rigsby | |
| D636,822 | S | 4/2011 | Levitan | |
| D693,884 | S | 11/2013 | Galdini Ferrazoli | |
| D704,273 | S | 5/2014 | Chudek | |
| D721,767 | S | 1/2015 | Ferrazoli | |
| 8,951,121 | B2 | 2/2015 | Lyons | |
| D727,431 | S | 4/2015 | Themann | |
| D740,887 | S | 10/2015 | Randazzo | |
| 9,589,414 | B2 | 3/2017 | Kelly | |
| D801,436 | S | 10/2017 | Stephenson, III | |
| 9,821,221 | B2 | 11/2017 | Patton | |
| 9,824,523 | B2 | 11/2017 | Cannon | |
| D818,048 | S | 5/2018 | Calhoun | |
| D822,766 | S | 7/2018 | Costa | |
| D827,719 | S | 9/2018 | Costa | |
| D854,620 | S | 7/2019 | Yeh | |
| D872,188 | S | 1/2020 | Bernard | |
| D872,189 | S | 1/2020 | Bernard | |
| D873,921 | S | 1/2020 | Bernard | |
| 10,559,165 | B1 | 2/2020 | Kelley | |
| D878,473 | S | 3/2020 | Theoni | |
| D880,609 | S | 4/2020 | Bernard | |
| D880,612 | S | 4/2020 | Bernard | |
| D880,614 | S | 4/2020 | Bernard | |
| D881,995 | S | 4/2020 | Bernard | |
| D883,391 | S | 5/2020 | Urban | |
| D886,905 | S | 6/2020 | Bernard | |
| D887,496 | S | 6/2020 | Urban | |
| D893,628 | S | 8/2020 | Thoeni | |
| D898,123 | S | 10/2020 | Butler | |
| D909,479 | S | 2/2021 | Abele | |
| D928,233 | S | 8/2021 | Park | |
| D948,621 | S | 4/2022 | Jadeja | |
| D951,358 | S | 5/2022 | Hemerick | |
| D954,830 | S | 6/2022 | Bussey | |
| D967,901 | S | 10/2022 | Hussey | |
| D976,324 | S | 1/2023 | Bussey | |
| D976,329 | S | 1/2023 | Schoonmaker | |
| D977,013 | S | 1/2023 | Schoonmaker | |
| D977,014 | S | 1/2023 | Bussey | |
| D977,579 | S | 2/2023 | Schoonmaker | |
| D977,580 | S | 2/2023 | Urban | |
| D978,248 | S | 2/2023 | Urban | |
| D978,249 | S | 2/2023 | Urban | |
| D990,577 | S | 6/2023 | Baerlocher | |
| 2005/0157269 | A1 | 7/2005 | Seto | |
| 2005/0230233 | A1 | 10/2005 | Hoehne | |
| 2006/0158504 | A1 | 7/2006 | Sugita | |
| 2006/0202968 | A1 | 9/2006 | Skillman | |
| 2006/0204303 | A1 | 9/2006 | Yurochko | |
| 2006/0281559 | A1 | 12/2006 | Luciano | |
| 2006/0289283 | A1 | 12/2006 | Jung | |
| 2008/0113737 | A1 | 5/2008 | Waxman | |
| 2008/0113766 | A1 | 5/2008 | Waxman | |
| 2008/0131184 | A1 | 6/2008 | Brown | |
| 2008/0311987 | A1 | 12/2008 | Hirato | |
| 2009/0124396 | A1 | 5/2009 | Vetter | |
| 2009/0131168 | A1 | 5/2009 | Waxman | |
| 2009/0227346 | A1 | 9/2009 | Yoshizawa | |
| 2009/0258697 | A1 | 10/2009 | Kelly | |
| 2010/0007258 | A1 | 1/2010 | Iwata | |
| 2010/0029361 | A1 | 2/2010 | Anderson | |
| 2010/0120530 | A1 | 5/2010 | Lesley | |
| 2010/0124962 | A1 | 5/2010 | Chudek | |
| 2010/0126836 | A1 | 5/2010 | Jung | |
| 2010/0267449 | A1 | 10/2010 | Gagner | |
| 2010/0291992 | A1 | 11/2010 | Greenberg | |
| 2011/0074296 | A1 | 3/2011 | Shen | |
| 2011/0074608 | A1 | 3/2011 | Kawamura | |
| 2011/0111852 | A1 | 5/2011 | Cohen | |
| 2011/0117994 | A1 | 5/2011 | Harvey | |
| 2011/0148766 | A1 | 6/2011 | Huang | |
| 2011/0157056 | A1 | 6/2011 | Karpfinger | |
| 2011/0269543 | A1 | 11/2011 | Johnson | |
| 2012/0004033 | A1 | 1/2012 | Lyons | |
| 2012/0050167 | A1 | 3/2012 | Krahenbuhl | |
| 2012/0067984 | A1 | 3/2012 | Matusch | |
| 2012/0101431 | A1 | 4/2012 | Matusch | |
| 2012/0172107 | A1 * | 7/2012 | Acres | G07F 17/34 463/16 |
| 2013/0029747 | A1 | 1/2013 | Kelly | |
| 2013/0029748 | A1 | 1/2013 | Kelly | |
| 2013/0217491 | A1 | 8/2013 | Hilbert | |
| 2014/0179429 | A1 | 6/2014 | Okazaki | |
| 2015/0086823 | A1 | 3/2015 | Liew | |
| 2015/0228153 | A1 | 8/2015 | Hedrick | |
| 2015/0233564 | A1 | 8/2015 | Arik | |
| 2015/0261297 | A1 | 9/2015 | Quek | |
| 2016/0335844 | A1 | 11/2016 | Onoyama | |
| 2016/0335845 | A1 | 11/2016 | Onoyama | |
| 2017/0224990 | A1 | 8/2017 | Goldwasser | |
| 2018/0078854 | A1 | 3/2018 | Achmueller | |
| 2019/0026989 | A1 | 1/2019 | Humphrey | |
| 2019/0066433 | A1 | 2/2019 | Jadeja | |
| 2019/0080547 | A1 | 3/2019 | Urban | |
| 2019/0080549 | A1 | 3/2019 | Lewis | |
| 2019/0086433 | A1 | 3/2019 | Hermann | |
| 2019/0096161 | A1 | 3/2019 | Barbour | |
| 2019/0102967 | A1 | 4/2019 | Lyons | |
| 2019/0102969 | A1 | 4/2019 | Lapalme | |
| 2019/0385401 | A1 | 12/2019 | Winston | |

OTHER PUBLICATIONS

Office Action dated Jun. 1, 2021 for U.S. Appl. No. 16/809,183 (pp. 1-20).
Office Action (Notice of Allowance and Fees Due (PTOL-85)) dated Nov. 3, 2021 for U.S. Appl. No. 16/809,183 (pp. 1-8).
Notice of Allowance dated Nov. 30, 2020 for U.S. Appl. No. 16/579,290 (pp. 1-15).
Office Action (Non-Final Rejection) dated Oct. 26, 2022 for U.S. Appl. No. 17/573,437 (pp. 1-11).
Office Action (Final Rejection) dated Mar. 23, 2023 for U.S. Appl. No. 17/573,437 (pp. 1-6).
Office Action (Notice of Allowance and Fees Due (PTOL-85)) dated Apr. 5, 2023 for U.S. Appl. No. 17/573,437 (pp. 1-8).
Office Action (Non-Final Rejection) dated Jul. 7, 2023 for U.S. Appl. No. 17/741,175 (pp. 1-11).
Office Action dated Aug. 25, 2023 for U.S. Appl. No. 29/731,291 (pp. 1-7).
Office Action (Notice of Allowance and Fees Due (PTOL-85)) dated Sep. 28, 2023 for U.S. Appl. No. 17/741,175 (pp. 1-10).
Office Action dated Dec. 12, 2023 for U.S. Appl. No. 29/731,291 (pp. 1-5).
Notice of Allowance dated Feb. 29, 2024 for U.S. Appl. No. 29/731,291 (pp. 1-7).

(56) References Cited

OTHER PUBLICATIONS

Office Action (Notice of Allowance and Fees Due (PTOL-85)) dated Sep. 3, 2024 for U.S. Appl. No. 18/513,142 (pp. 1-8).

* cited by examiner

ELECTRONIC GAMING MACHINE INCLUDING HYBRID VIRTUAL AND PHYSICAL BUTTON AREA

CROSS REFERENCE TO RELATED APPLICATIONS

This application is a continuation of and claims priority to U.S. patent application Ser. No. 17/573,437, now U.S. Pat. No. 11,734,990, filed Jan. 11, 2022, which is a continuation of U.S. patent application Ser. No. 16/809,183, now U.S. Pat. No. 11,288,912, filed Mar. 4, 2020, the contents and disclosure of which are incorporated by reference herein in their entireties.

TECHNICAL FIELD

The field of disclosure relates generally to electronic gaming, and more particularly, to an electronic gaming machine including a hybrid display area.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A display for use in an electronic gaming machine (EGM) is described herein. The display is configured such that a portion of the display includes a hybrid display area, another portion of the display includes a dynamic button deck, including at least one dynamic button (e.g., a physical button with an image beneath it produced by an LCD, LED, or OLED display that can be changed by an electronic input), and a further portion of the display is covered by a physical overlay, such as a metal or glass overlay. The hybrid display area and dynamic button deck are configured to display different options for use in a wagering game depending on the wagering game selected by a user. Thus the same electronic gaming machine may be used for different wagering games due to the flexibility of the display, and more specifically due to use of the hybrid display area and dynamic button deck described herein on the same EGM.

An EGM is described herein. The EGM includes a game controller configured to execute at least one wagering game, a credit input device configured to receive a wager, a first display including a touchscreen portion and configured to prompt a user to select a wagering game from the at least one wagering game executable by the game controller, and a second display. The second display includes a hybrid display area with a touchscreen input component and a dynamic button deck configured to receive player input during play of a user-selected wagering game. The dynamic button deck assembly includes a button deck display area and a dynamic button deck having at least one mechanical push button including a lens cap.

DETAILED DESCRIPTION

An electronic gaming machine (EGM) is described herein. The EGM includes a game controller, a credit input device, a first display configured to prompt a user to select a wagering game, and a second display. The second display includes a hybrid display area with a touchscreen input component and a dynamic button deck configured to receive player input during play of the user-selected wagering game. Each dynamic push button in the dynamic button deck is configured to display at least one option associated with the user-selected wagering game. In some embodiments, the hybrid display area may include at least one virtual button configured to display further options associated with the user-selected wagering game. Thus, a user of the EGM described herein has the option to play many different games on the same EGM without sacrificing the functionality of, for example, machines with only virtual buttons and/or machines with only mechanical buttons.

At least some of the technical problems addressed by this system includes: (a) the high cost of multiple mechanical button rows on a button deck of a gaming machine; (b) user desire to select from a variety of wagering game options on the same EGM; (c) user desire to wager a variety of wagering amounts on the same EGM; (d) some users desiring the feel of mechanical pushbuttons on an EGM, while some other users desiring virtual pushbuttons on the EGM; (e) users having to use different gaming machines in order to play different games; and (f) the high cost of requiring multiple gaming machines to play different games.

A technical effect of the systems and processes described herein is achieved by performing at least one of: (a) providing a first or main video display; (b) providing a second video display that includes a dynamic button deck, a hybrid display area, and at least one button separate from the dynamic button deck and hybrid display area; (c) causing to be displayed, on the first video display, a plurality of wagering game options; (d) receiving user selection of a wagering game option; and (e) causing to be displayed, on the dynamic button deck and the hybrid display area, features associated with the selected wagering game including user input options.

The technical effects and advantages achieved by this system include at least one of: (a) lower gaming machine cost by only providing one row of mechanical pushbuttons on an EGM, with the same functionality of a gaming machine with two or more rows of mechanical pushbuttons; (b) higher flexibility by providing a plurality of game options on the same gaming machine; (c) higher flexibility by providing a plurality of wagering options for wagering games on the gaming machine; (d) ease of changing from one game type to another game type (e.g., a poker game to a slot game and vice versa) on the same gaming machine; and (e) lower costs by only requiring one gaming machine to play a plurality of different games.

Figure 1:
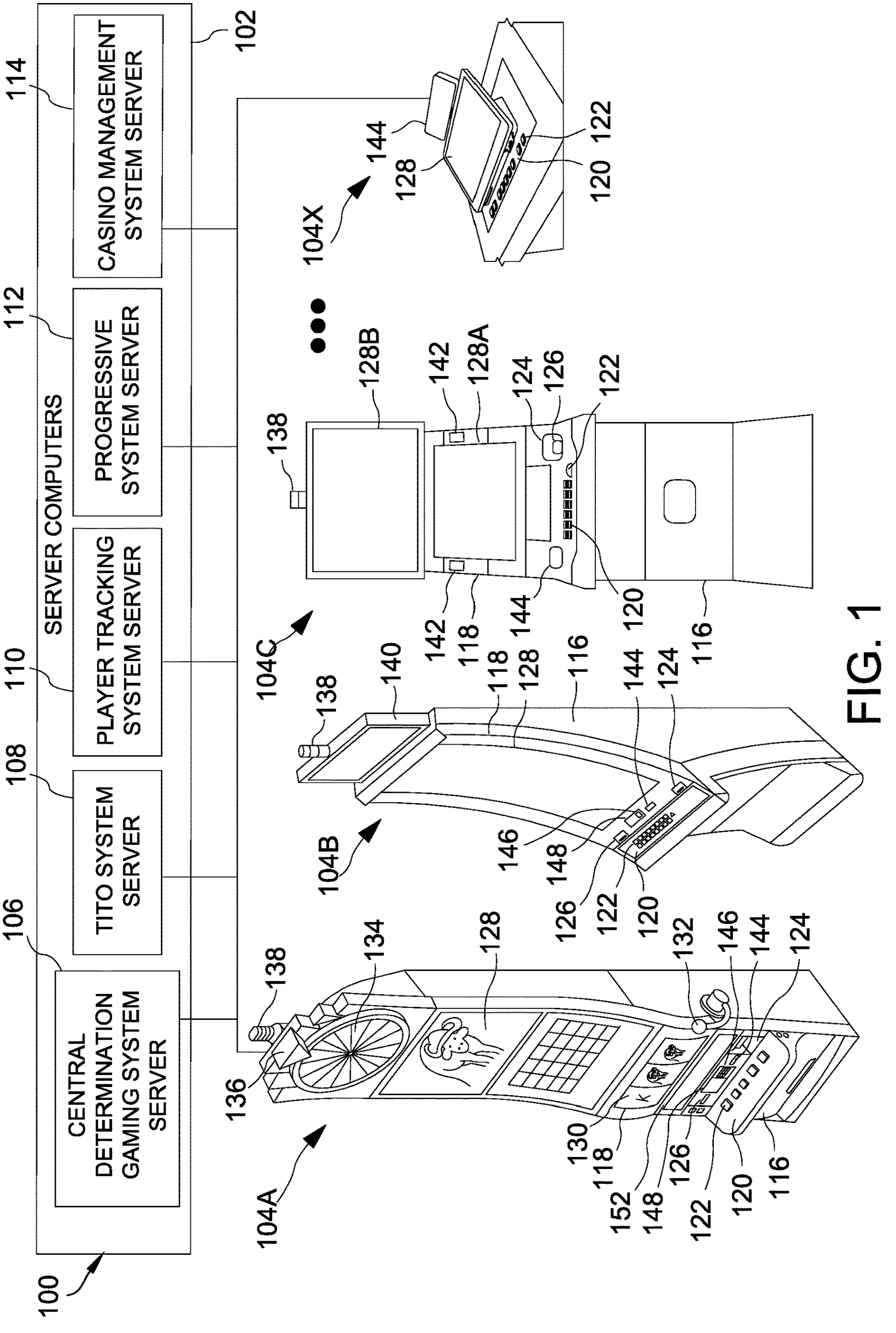
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
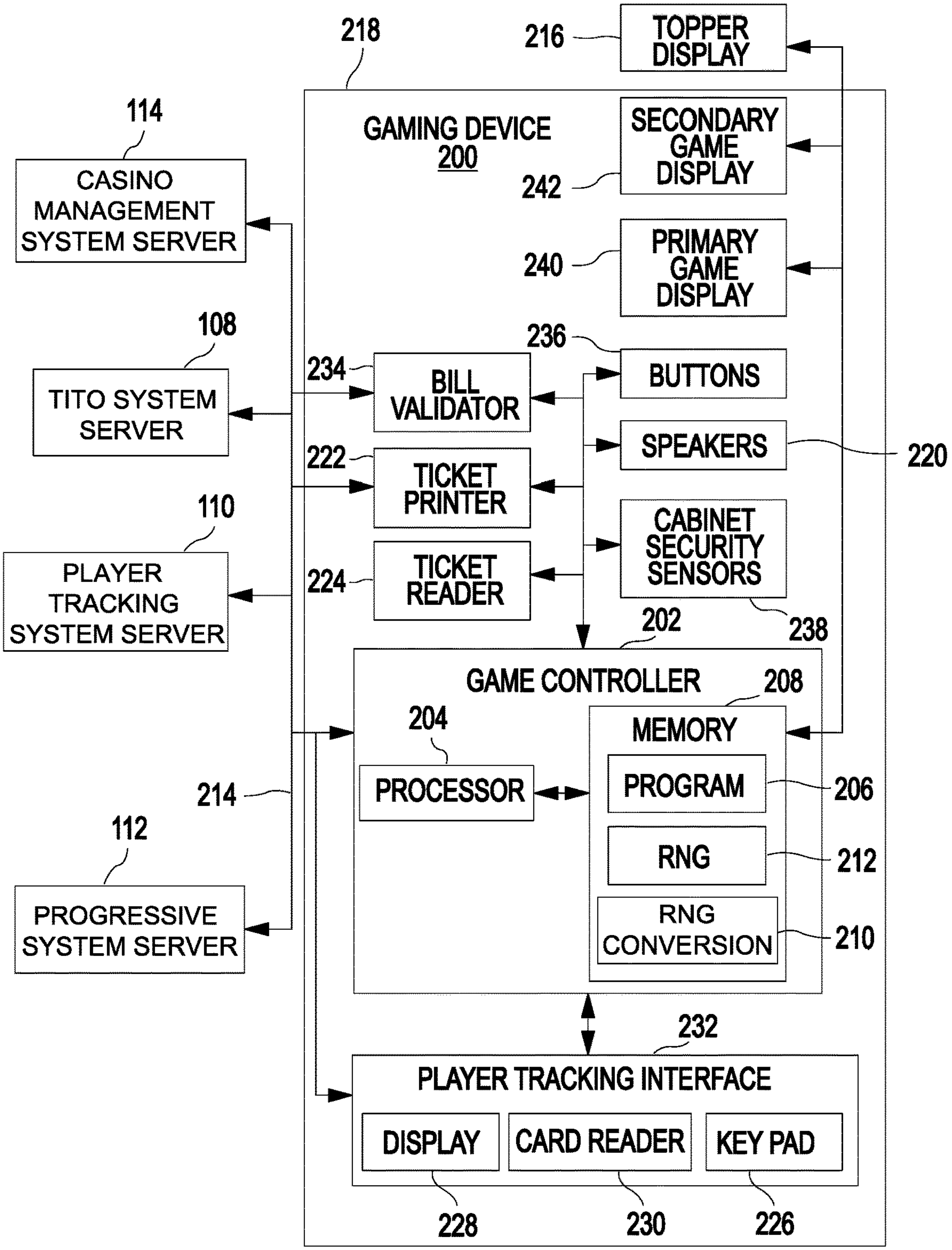
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Yet another example gaming device 104X is a tabletop or bar top gaming device that may provide many different types of games, including, for example, mechanical slot games, video slot games, video poker, video blackjack, video pachinko, keno, bingo, and lottery. Each gaming device 104 may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Any of the gaming devices 104 may include a button deck 120. In the example embodiments described herein, the button deck 120 may include a button deck assembly (not separately shown in FIG. 1) that includes one or more buttons 122 that may be configurable and that may be back-lit by an LCD button deck display device within the button deck 120.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (e.g., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. The present disclosure also provides improvements in cost efficiency for gaming machines requiring two rows of buttons. The present invention only discloses one row of mechanical buttons for games that would typically require two rows of mechanical buttons, thus lowering the overall cost of the gaming machine by only requiring one row of mechanical buttons instead of two. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
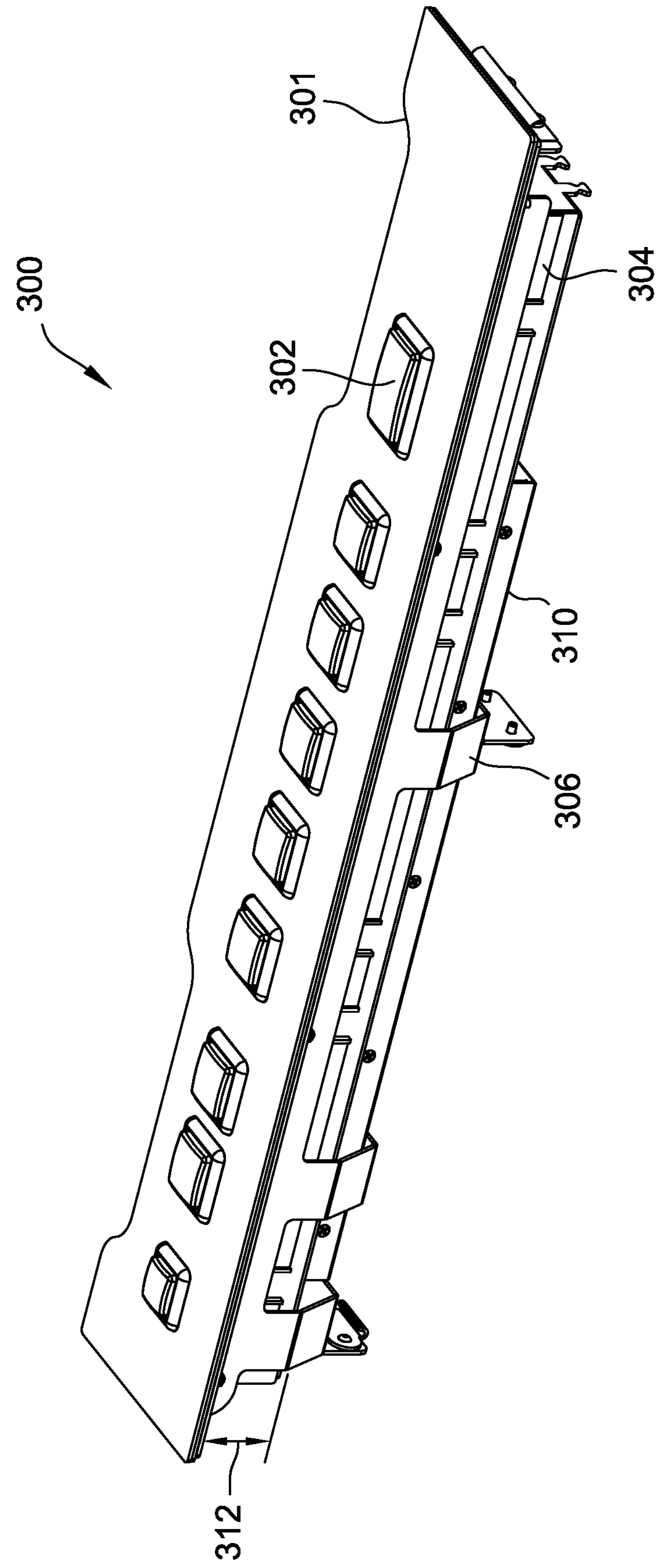
FIG. 3 is a perspective view of a button deck assembly for an EGM shown in FIG. 1.

FIG. 3 is a perspective view 300 of a button deck assembly 301. In some embodiments, button deck assembly 301 may be similar to button deck 120 (shown in FIG. 1), and may be installed within an EGM such as gaming devices 104A-104X. In the example embodiment, button deck assembly 301 includes multiple dynamically configurable, mechanical pushbuttons 302 (similar to or the same as buttons 122, shown in FIG. 1 on button deck 120). Pushbutton 302 may include a lens cap 402 (shown in FIG. 4) and a button bezel 502 (shown in FIG. 5). Button deck assembly 301 utilizes a liquid crystal display (LCD) panel 404 (shown in FIG. 4) to produce sharp images and/or visual impressions that are visible through pushbuttons 302, and that may be configured or dynamically reconfigured for operational needs (e.g., to support particular games, to switch between different types of games). In other embodiments, button deck assembly 301 may utilize other flat panel display technology in lieu of LCD panel 404, such as organic light-emitting diode (OLED) technology. Button deck assembly 301 may include any suitable number of pushbuttons 302 of varying size, shape, and/or structure. Additionally or alternatively, pushbuttons 302 may be spaced apart in any suitable configuration.

Dynamic mechanical pushbuttons 302 may have practically any appearance desired depending on the electronic configuration of the player interface by game controller 202 (shown in FIG. 2). In some embodiments, player tracking system server 110 (shown in FIG. 1) may transmit messages and/or display attract mode sequences to pushbuttons 302 to change the appearance of pushbuttons 302. Some EGMs are configured to switch from presenting one type of wagering game, such as, for example, slot games, to another type of wagering game, such as, for example, video poker games. For example, pushbuttons configured to display prompts associated with video poker games may be electronically reconfigured to display prompts associated with slot games. In other words, a pushbutton that may display a "spin" label in one type of game may be able to display a "bet" label for a different type of game and/or a hold/cancel button in yet another different type of game. As such, the same button deck assembly 301 can facilitate presentation and play of multiple and different wagering games on the same EGM.

In the exemplary embodiment, an elastomeric membrane 304 protects sensitive electronics, such as a printed circuit board assembly (PCBA) 406 and optical blocks 408 (both shown in FIG. 4) from fluid infiltration (e.g., drink spills). In the exemplary embodiment, membrane 304, as explained in detail below, is a water-resistant elastomeric membrane, such as, for example, a silicone membrane, that routes liquid flow around and past sensitive internal electronics, thereby maintaining a separation between the liquid and the protected components.

Button deck 301 is electronically reconfigurable, such that pushbuttons 302 may be designated or re-designated (i.e., configured and reconfigured) with clear prompts and/or information specific to different types of wagering games. For example, pushbuttons 302 may display video poker prompts, such as "hold," "bet one," "bet max," "cancel," "draw," and "deal," when a player selects a video poker game. In the same example, pushbuttons 302 may be re-designated to display slot machine game prompts such as a number of paylines to be used in the slot machine game and/or a monetary wager to be applied to the slot machine game and/or visual impressions, such as a spin button, when the player selects a slot machine game. Advantageously, display panel 404 provides bright, full color images with sharp resolution. These images are projected from the display panel 404 onto (e.g., up to) the lens caps 402 of each button. Thus, as opposed to conventional button decks that are custom designed for a specific game, electronically reconfigurable button deck assembly 301 utilizes LCD technology to provide both quality images and visual impressions with substantial cost savings and protect that LCD technology and other sensitive electronics from liquid ingress.

In various embodiments, not all pushbuttons 302 provided on button deck 120 may be used. Depending on the type of wagering game selected by the player, some pushbuttons 302 may not be used for playing that particular game. Pushbuttons 302 that are not used may remain blank (e.g., no image). In other embodiments, unused pushbuttons 302 may display a static LCD image, including labels and logos, such as, for example, the Aristocrat® logo. Pushbuttons 302 that are not used during a particular wagering game may be configured to be unresponsive when actuated by a player. In further embodiments, unused pushbuttons 302 may subsequently be activated by game controller 202 to provide player attract mode displays.

Button deck assembly 301 further includes a drip tray 306 (e.g., a gutter) configured to capture and collect liquid. When liquid is spilled on top of button deck 120 and comes in contact with membrane 304, the liquid is directed to outer edges 422 and 424 (shown in FIG. 4) of membrane 304, such that the liquid runs down a height 312 of membrane 304 (along the Z-axis), outside of sensitive internal electronic components, and collects in drip tray 306 for subsequent removal. In various embodiments, drip tray 306 directs the collected liquid to one side of the gaming machine. In some embodiments, the drip tray 306 may include an outlet with a nipple coupled in flow communication with a hose leading to a collection reservoir (not shown). Thus, any liquid spilled on button deck 120, including pushbuttons 302, will generally be prevented from passing through membrane 304, and potentially damaging printed circuit board assembly (PCBA) 406, optical blocks 408, display panel 404, and other electronic components.

Figure 4:
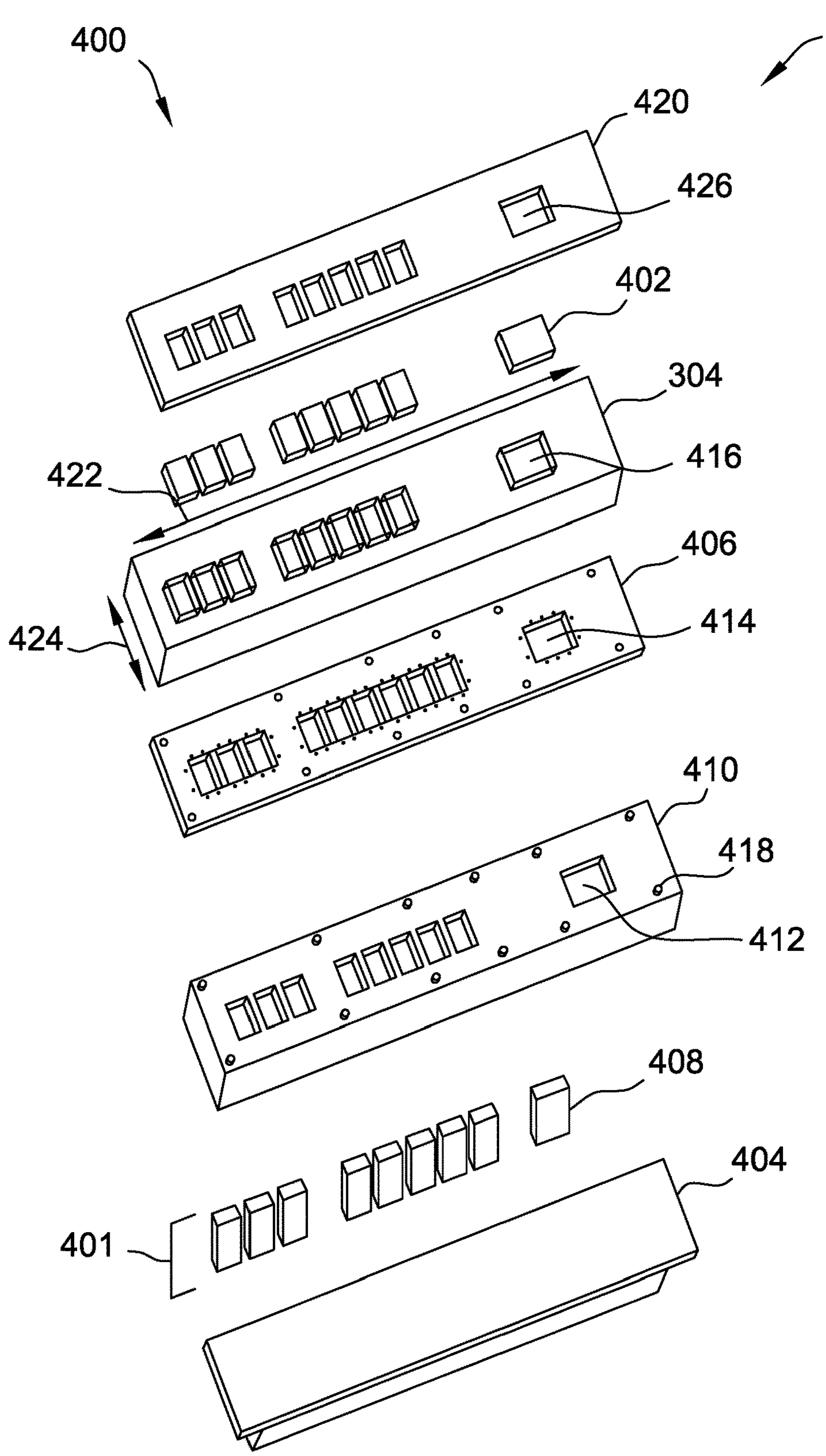
FIG. 4 is an expanded schematic view of the button deck assembly shown in FIG. 3, with certain components removed to illustrate an exemplary optical block arrangement.

FIG. 4 is an expanded schematic view 400 of button deck assembly 301, with certain components removed to illustrate an exemplary optical block arrangement 401. Button deck assembly 301 includes a display panel 404, optical blocks 408, a carrier tray 410, PCBA 406, membrane 304, lens caps 402, and a metal top plate 420. In various embodiments, metal top plate 420 may be manufactured from any suitable materials, such as, for example, steel, aluminum, plastic, zinc, and glass material. Button deck assembly 301 utilizes display panel 404 to produce full color images or visual impressions. Display panel 404 may be, for example, an LCD display or an OLED display. An optical block arrangement 401 that includes a plurality of optical blocks 408 is positioned on display panel 404. A bottom face (not shown) of each optical block 408 is in direct contact with display panel 404. Optical blocks 408 are generally elongated structures, such as, for example, rectangular prisms.

In the exemplary embodiment, each optical block 408 extends through a corresponding tray aperture 412 of the carrier tray 410, a PCBA aperture 414 of the PCBA 406, and a membrane aperture 416 of membrane 304, allowing a top surface of each block 408 to an air gap beneath one of the lens caps 402. More specifically, optical block 408 extends through carrier tray 410, PCBA 406, and membrane 304, such that an upper portion of optical block 408 protrudes from membrane 304 and sits underneath lens cap 402. Optical blocks 408 enable images from display panel 404 to be transmitted to pushbuttons 302. More specifically, optical blocks 408 transfer images from display panel 404 to an underside (not shown) of a corresponding lens cap 402, where the lens caps 402 acts as working surfaces of the push buttons 302. In the exemplary embodiment, optical block arrangement 401 includes nine optical blocks 408 in a linear configuration. Each optical block 408 corresponds to a respective lens cap 402, and accordingly, to a respective pushbutton 302. Alternatively, optical block arrangement 401 may include any number of optical blocks 408 depending on the number of pushbuttons 302 provided on button deck 120 (shown in FIG. 1).

Optical blocks 408 do not move up and down when pushbuttons 302 are actuated by a player. Rather, a bottom surface of each optical block 408 rests on a top surface of the display panel 404. Optic block 408 may be positioned in an optic block retainer 506 (shown in FIG. 5), which restricts movement of the optical block 408, keeping the optical block 408 flush with the surface of the display panel 404, where the carrier tray 410 restricts movement of the optical blocks 408 in the plane of the display panel 404. Optical blocks 408 need to be firmly secured on top of display panel 404 to transmit clear images from display panel 404 to pushbuttons 302. When optical blocks 408 are not tightly secured, images transmitted by optical blocks 408 may become blurry and distorted.

Apertures (e.g., holes) 412, 414, and 416 are sized in relation to each corresponding optical block 408. Carrier tray 410 is configured to secure optical blocks 408 to display panel 404. Optical block 408 extends through tray aperture 412, which is sized and fitted to secure optical block 408, thereby preventing optical blocks 408 from moving in a general direction of the x-axis or y-axis. Carrier tray 410 may further include mounting provisions 418, such as fasteners, to mount PCBA 406 to carrier tray 410. For example, mounting provisions 418 may include mounting holes, screws, and/or latching mechanisms to mechanically coupled and fasten PCBA 406 to carrier tray 410. Carrier tray 410 may be a plastic or metal housing or plate.

Figure 5:
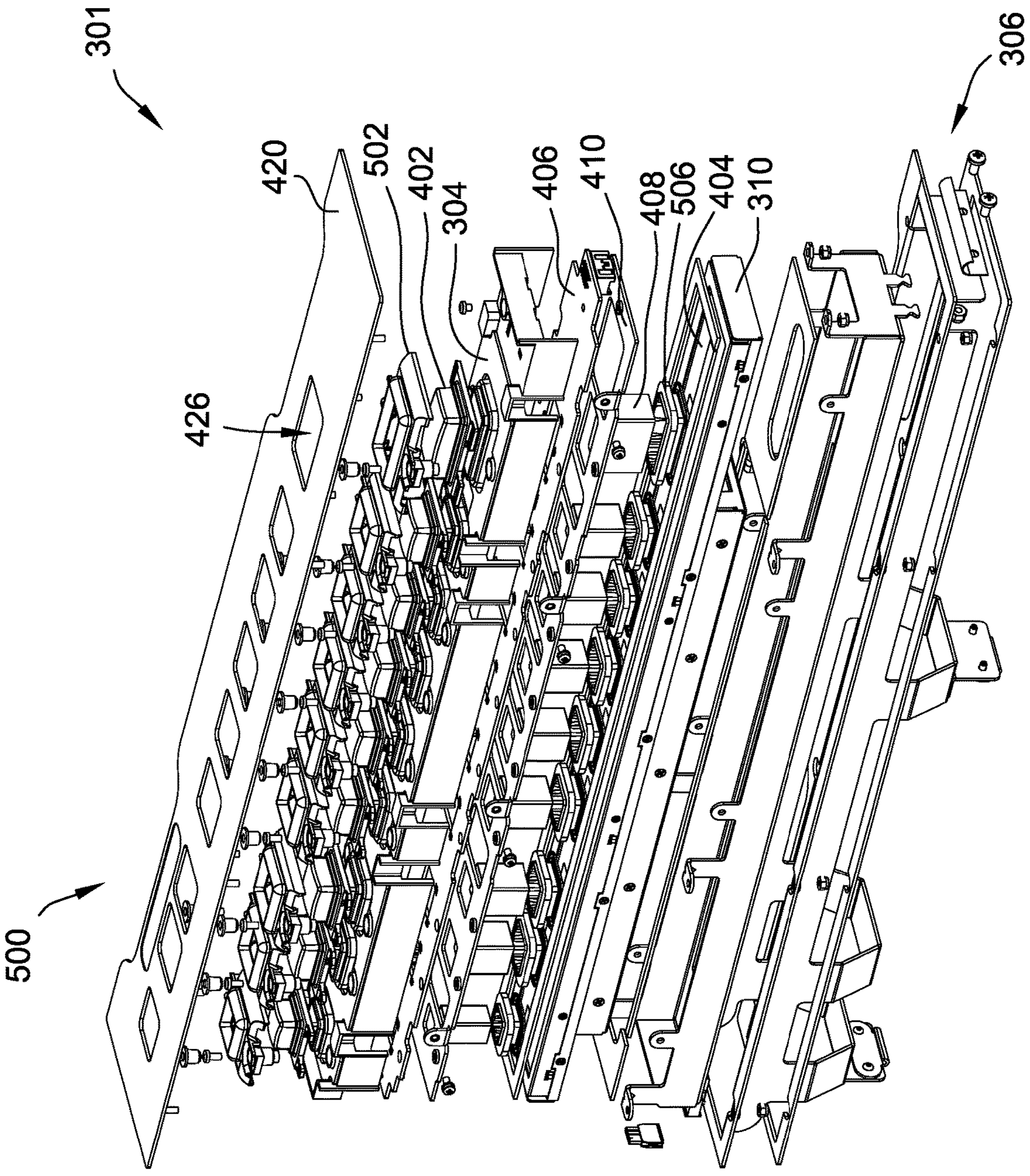
FIG. 5 is a complete expanded view of the button deck assembly shown in FIG. 3.

FIG. 5 is an expanded view 500 of the button deck 301 assembly shown in FIG. 3. In the example embodiment, each button 302 of the button deck assembly 301 also includes a button bezel 502 disposed between the button lens 402 and the top plate 420 that frames and contains the button lens 402. Further, each optical block 408 is framed and held in place by an optical block retainer 506. The optical block retainer 506 is configured to hold the optical block 408 stationary relative to the top surface of the display panel 404.

During operation, liquid spills can occur onto the button deck assembly 301 (e.g., onto the top surface of top plate 420, onto buttons 302). Liquid ingress can occur through plate apertures 426 (e.g., between top plate 420 and button bezel 502, between button bezel 502 and button lens 402). The membrane 304 traps any such liquid paths and routes flow outward and down front and back surfaces of the of the membrane 304. In an assembled state, electrical components of the button deck assembly 301, such as the PCBA 406 and the display panel 404, reside underneath and within the membrane 304. As such, the membrane 304 causes such liquid flow to pass around the sensitive electrical components and down into the drop tray 306 for collection.

Figure 6:
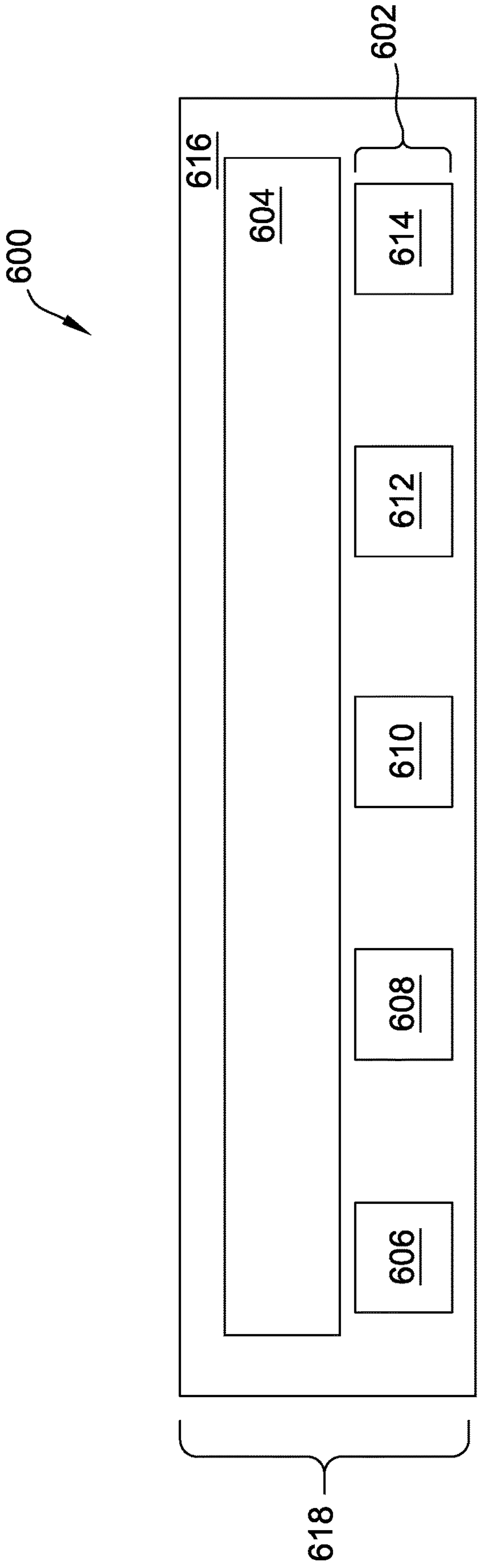
FIG. 6 is an exemplary diagram of an electronic display including a dynamic button deck and a hybrid display area.

FIG. 6 is an exemplary diagram of a hybrid button deck 600 (e.g., similar to button deck 301 shown in FIGS. 3-5) including a display panel 618, a physical overlay 616, a dynamic button deck 602, and a hybrid display area 604. In the example embodiment, dynamic button deck 602 includes buttons 606, 608, 610, 612, and 614. In the example embodiment, buttons 606-614 have similar characteristics to pushbuttons 302 described above. In other embodiments, buttons 606-614 may be varying in size, shape, and/or structure, and may be spaced apart in any suitable configuration. In some embodiments, display panel 618 may include characteristics similar to display panel 404, and physical overlay 616 may include similar to characteristics metal top plate 420.

In the example embodiment, hybrid display area 604 is a portion of display panel 618, wherein display panel 618 includes the entirety of hybrid display area 604, the portion underlying buttons 606-614, and the portion underlying physical overlay 616. In further embodiments hybrid display area 604 may include a touchscreen input component such that human touch can be detected.

A physical overlay 616 is configured to be placed on top of display panel 618 such that hybrid display area 604 and buttons 606-614 may still be accessed by a user, but the remaining portions of display panel 618 are covered. In some embodiments physical overlay 616 may be a glass overlay. In other embodiments, physical overlay 616 may be a metal overlay, such as metal plate 420, or an overlay of any suitable material.

Figure 7:
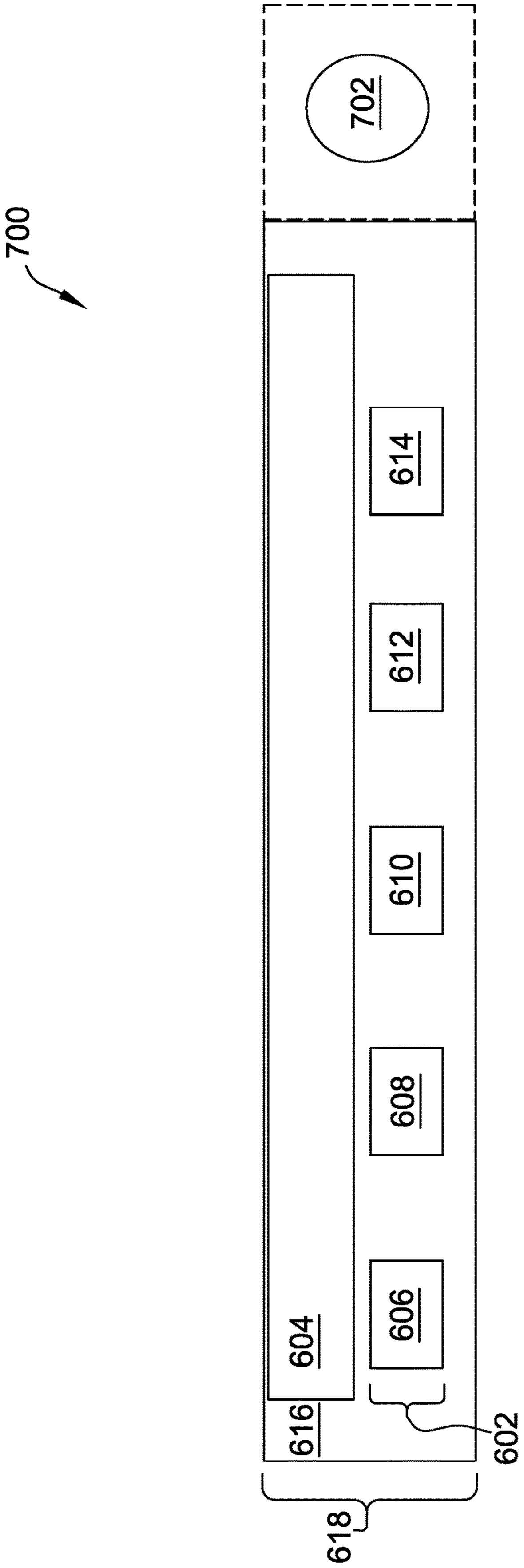
FIG. 7 is an exemplary diagram of the electronic display shown in FIG. 6 with an additional button outside of the display.

FIG. 7 is an exemplary diagram of a display configuration 700 including a dynamic button deck 602, a hybrid display area 604, a physical overlay 616, and an additional button 702 separate from the components of hybrid button deck 600 shown in FIG. 6. In some configurations, display panel 618 may extend underneath button 702 such that button 702 operates similar to pushbuttons 302. In embodiments where display panel 618 extends to button 702, button 702 may be a virtual pushbutton or a button similar to pushbuttons 302. In some embodiments, button 702 may be a mechanical pushbutton. In other embodiments display panel may not extend underneath button 702.

Figure 8:
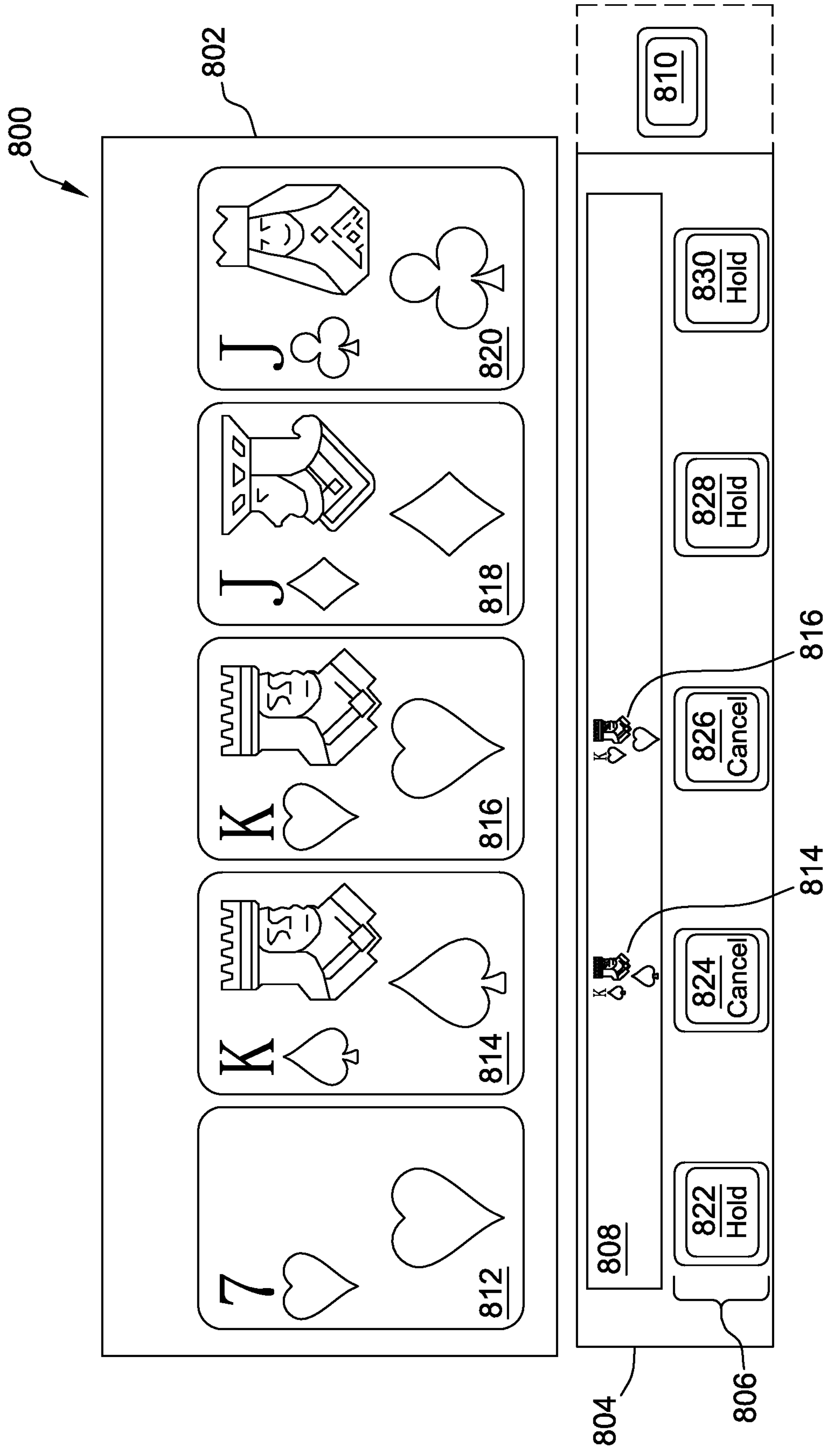
FIG. 8 is an exemplary diagram of a first display and a second display during a wagering game, wherein the second display includes a dynamic button deck and a hybrid display area.

FIG. 8 is an exemplary diagram of a first display 802 and a second display 804 during a wagering game, wherein the second display 804 is similar to display panel 618, and includes a dynamic button deck 806 and a hybrid display area 808. Exemplary diagram demonstrates an example configuration of first display 802 and second display 804 during a card game embodiment. In this embodiment, a player's "hand" is shown on the first display 802, indicating the virtual playing cards a user can hold, or keep in their hand. After selecting cards to "hold," if any, a user may select the "draw" button in order to replace all cards in their hand that are not selected as "held." Button 810 is a button similar to button 702, as described above. In some embodiments, second display 804 may extend underneath button 810.

Each of the cards 812-820 shown on the first display 802 correspond to one of the buttons 822-830 on the dynamic button deck 806. For example, card 812 corresponds with button 822, and so forth. In the embodiment shown, cards 814 and 816 are currently selected as held by a player. Thus, cards 814 and 816 are also displayed on hybrid display area 808 above their corresponding buttons 824 and 826. This is an improvement in that a user can easily see which cards are currently selected as held. While playing card games, such as the card game shown in FIG. 8, it is important for players to not make errors in which cards they want to hold. By displaying the held cards on hybrid display area 808, in addition to on first display 802, the chances of a user holding an incorrect card or not holding a card desired to be held is lessened.

A user is further presented with an option to cancel on corresponding buttons 824 and 826. If button 824 is selected by a user, the card will no longer will be held, and the portion of second display 804 under button 824 will change to show a "hold" option, such that the "hold" option is displayed on button 824, and card 814 will no longer appear in hybrid display area 808.

Similarly, cards 812, 818, and 820 are currently not held by a player. Thus, corresponding buttons 822, 828, and 830 display a hold option. Upon user selection of the hold option, the corresponding card will be selected as held and shown on hybrid display area 808 above the corresponding button. After being selected as held and shown on hybrid display area 808, the portion of second display area 804 under the corresponding button will change to show a "cancel" option, such that the "cancel" option is displayed on the button corresponding to the held card.

Upon user selection of "draw" button 810, the user will receive a new hand of cards, including the cards selected as held before user selection of draw button 810, and cards not selected as held will be replaced with new cards.

Figure 9:
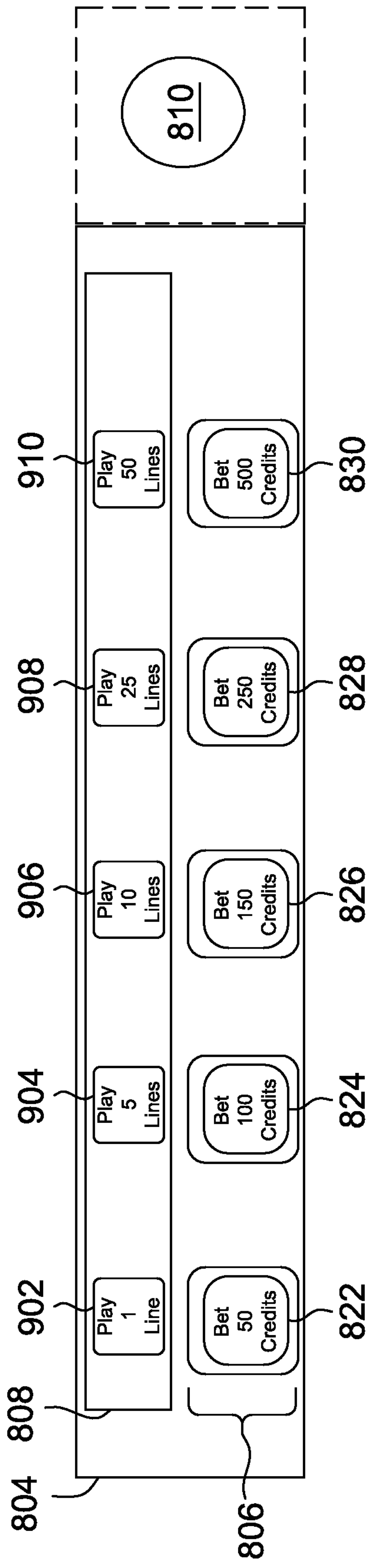
FIG. 9 is an exemplary diagram of a first display and a second display during a wagering game, wherein the second display includes a dynamic button deck and a hybrid display area, the hybrid display area including a hybrid button deck.

FIG. 9 is an exemplary diagram 900 of a second display 804 during a wagering game, wherein the second display 804 includes a dynamic button deck 806 and a hybrid display area 808, the hybrid display area 808 including a hybrid button deck of virtual buttons 902-910. Exemplary diagram 900 demonstrates an example configuration of second display 804 during a slot game embodiment.

In the slot embodiment shown, buttons 822-830 in dynamic button deck 806 are configured to each display a number of credits to be bet in the slot game. Hybrid display area 808 is configured to display virtual buttons 902-910, wherein each virtual button displays a number of paylines that may be used in the slot game. Hybrid display area 808 is configured to have a touchscreen input component, such that display area 808 can detect a user selection of one or more virtual buttons 902-910.

For example, as shown in diagram 900, a user may select a number of paylines to be used in the slot game by selecting one of virtual buttons 902-910 in hybrid display area 808. Based upon a number of paylines chosen, the portion of the second display 804 area underneath dynamic button deck 806 is configured to change such that each button 822-830 in dynamic button deck 806 is configured to show a number of credits to be played in the bonus game. Exemplary diagram 900 demonstrates an instance after a user selection to play 50 lines (e.g., as shown in virtual button 910). The game shown is configured such that one credit is played for each payline. Accordingly, each button 822-830 in dynamic button deck 806 shows an increment of 50 credits. In other words, because a user has selected to play 50 lines, no less than 50 credits, and only increments of 50 credits may be used for play in the slot game as shown. In other instances, for example where a user selects to play 5 lines (e.g., as shown in virtual button 904), buttons 822-830 would display increments of 5 credits (5, 10, 15, and so on).

The dynamic capabilities of buttons 822-830 in button deck 806, and virtual buttons 902-910 in hybrid display 808, allow a user to bet a different number of credits for each play of the slot game. Current systems using mechanical button decks do not allow a user to select a number of paylines and a number of credits to be played in a slot game, without requiring a second row of mechanical buttons. Requiring a second row of mechanical buttons can be burdensome and expensive. Thus, the present embodiment provides a benefit in that a user can select a number of paylines and a number of credits to be bet using only one dynamic button deck 806 and one hybrid button deck 808.

As an example, many current systems have a predefined number of paylines and only allow a user to select a number of credits to be bet in a slot game. Thus, if a user is playing a game that requires a minimum of 50 paylines (otherwise known as a "forced line" of 50 paylines), at 1 credit per payline, and the user only has 15 credits left to play with, that user can no longer play that slot game because a minimum of 50 credits would be required to do so. A user would then have to find a different slot game with a different number of paylines, for example, to wager their remaining 15 credits. However, as shown in the example embodiment in diagram 900, a user with 15 credits left could change the number of paylines to 5, for example, and could then wager all 15 credits, or 5 or 10 of the credits, without having to find a different machine. Another option the user has in the example embodiment would be to change wagering games completely. For example, a user could select on the primary display 802, or in some embodiments on the secondary display 804, to switch from playing the slot game shown in diagram 900 to playing the card game shown in diagram 800. Upon switching to the card game, the images displayed by buttons 822-830 would change to display options available for the card game as described above, and hybrid display area 808 would change to no longer display virtual buttons 902-910, but rather display options associated with the card game as described above. In some embodiments, upon changing from game to game, the hybrid display area 808 may be configured to have the touchscreen input component turned on or off. For example in the card game of diagram 800, the touchscreen input component would be turned off because no buttons are available in the hybrid display area 808, but in the slot game of diagram 900 the touchscreen input component would be turned on because the slot game allows for user selection of virtual buttons 902-910.

Figure 10:
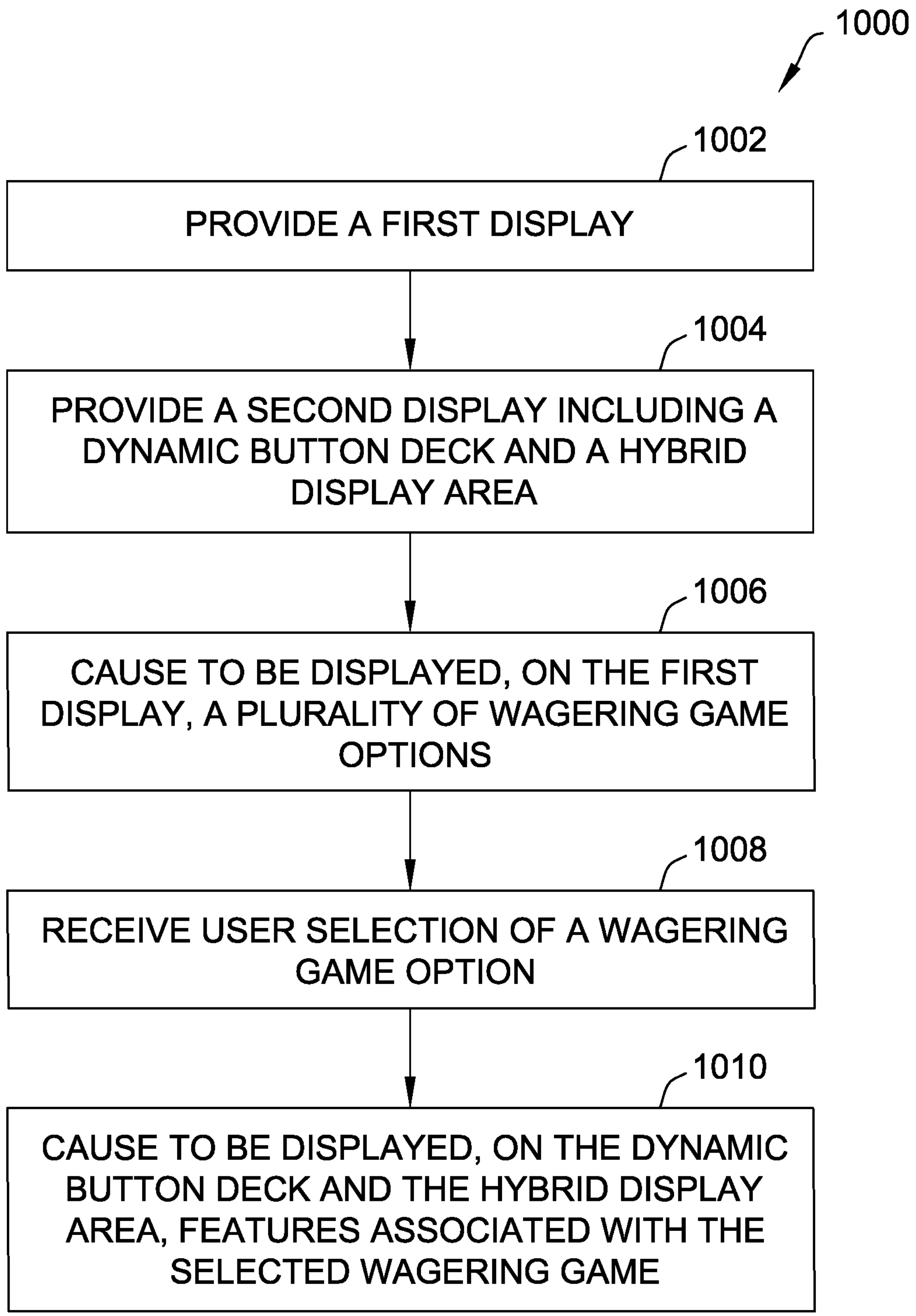
FIG. 10 is an example flow diagram demonstrating an example use of a gaming machine and gaming components described herein.

FIG. 10 is an example flow diagram 1000 demonstrating an example use of a gaming machine and gaming machine components described herein. The example gaming machine is configured to provide 1002 a first display 802, provide 1004 a second display 804, including a dynamic button deck 806, a hybrid display area 808, and at least one button 810 separate from the dynamic button deck 806 and hybrid display area 808, and cause to be displayed 1006 on the first display 802, a plurality of wagering game options. The gaming machine is further configured to receive 1008 user selection of a wagering game option, and cause to be displayed 1010, on the dynamic button deck 806 and the hybrid display area 808, features associated with the selected wagering game.

Figure 11:
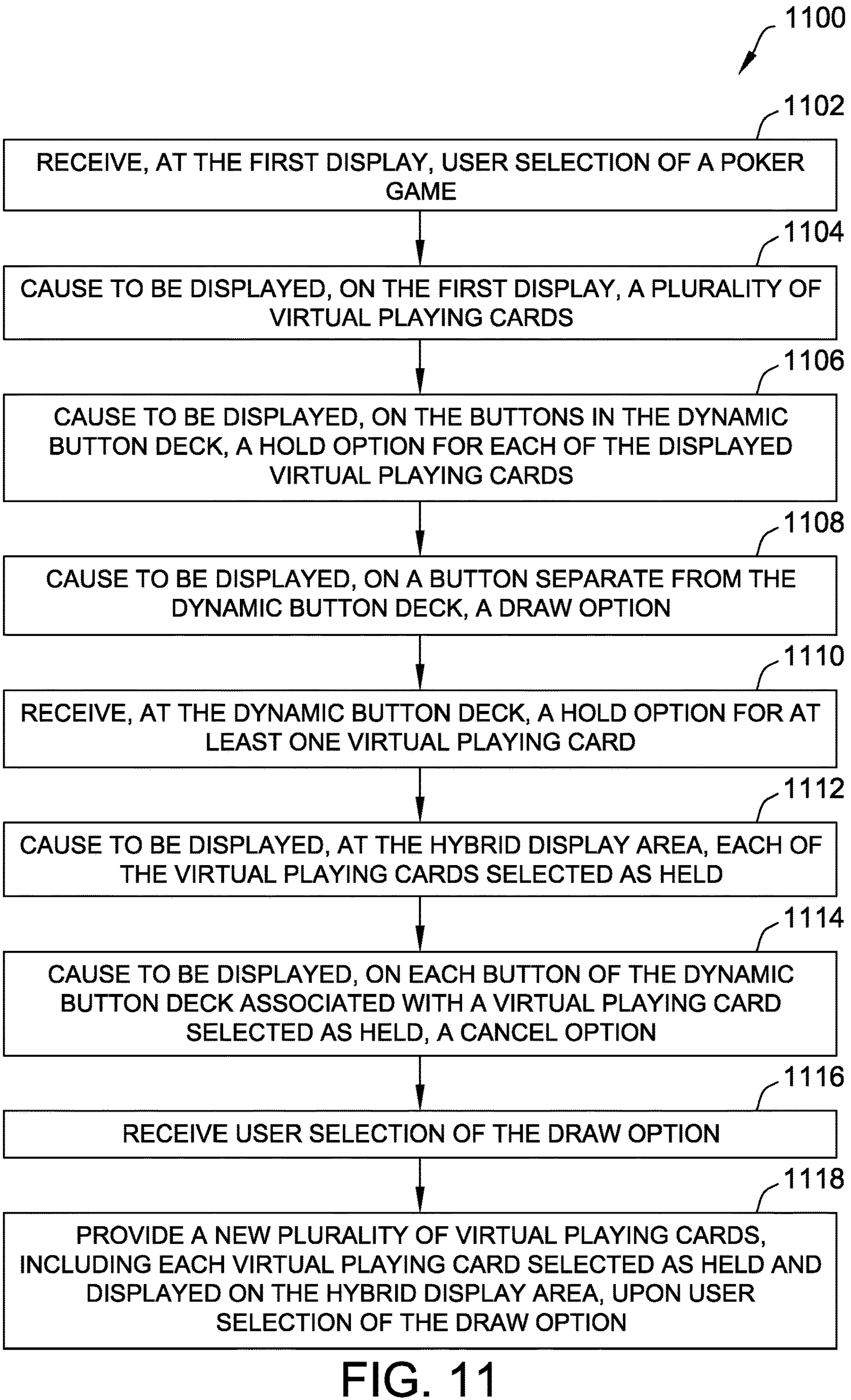
FIG. 11 is an example flow diagram demonstrating a further example use of a gaming machine described herein upon user selection of a card game.

FIG. 11 is an example flow diagram 1100 demonstrating a further example use of the gaming machine described herein upon user selection of a card game. In this embodiment, the gaming machine is configured to receive 1102, at the first display 802, user selection of a poker game, cause to be displayed 1104, on the first display 802, a plurality of virtual playing cards, cause to be displayed 1106, on the buttons 822-830 in the dynamic button deck 806, a hold option for each of the displayed virtual playing cards, and cause to be displayed 1108, on a button 810 separate from the dynamic button deck 806, a draw option. The gaming machine is further configured to receive 1110, at the dynamic button deck 806, a hold option for at least one virtual playing card, cause to be displayed 1112, at the hybrid display area 808, each of the virtual playing cards selected as held, and cause to be displayed 1114, on each button of the dynamic button deck 806 associated with a virtual playing card selected as held, a cancel option. The gaming machine is yet further configured to receive 1116 user selection of the draw option, and provide 1118 a new plurality of virtual playing cards, including each virtual playing card selected as held and displayed on the hybrid display area 808, upon user selection of the draw option.

Figure 12:
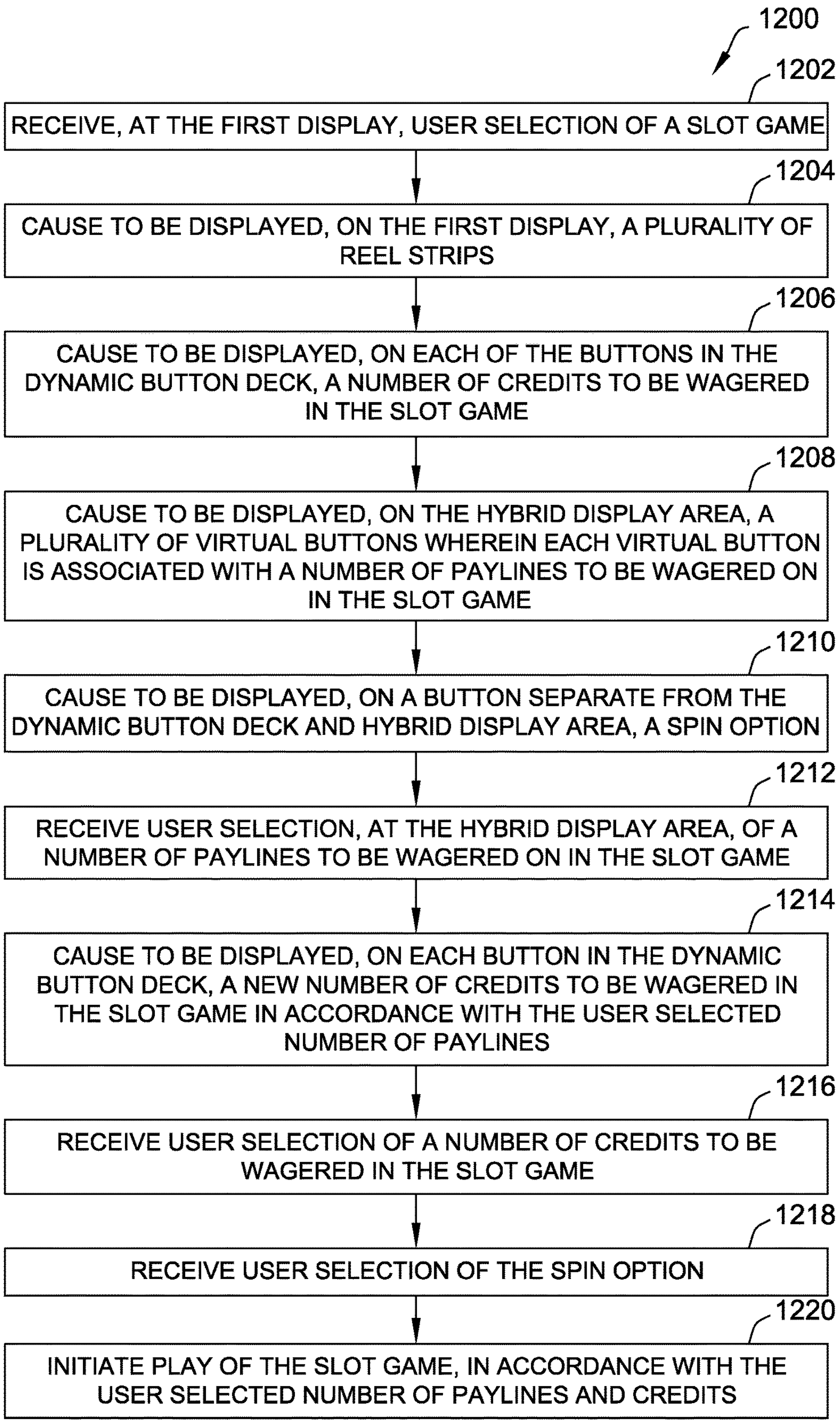
FIG. 12 is an example flow diagram demonstrating a further example use of a gaming machine described herein upon user selection of a slot game.

FIG. 12 is an example flow diagram 1200 demonstrating another use of a gaming machine described herein upon user selection of a slot game. In this embodiment the gaming machine is configured to receive 1202, at the first display 802, user selection of a slot game, cause to be displayed 1204, on the first display 802, a plurality of reel strips, cause to be displayed 1206, on each of the buttons 822-830 in the dynamic button deck 806, a number of credits to be wagered in the slot game, cause to be displayed 1208, on the hybrid display area 808, a plurality of virtual buttons wherein each virtual button is associated with a number of paylines to be wagered on in the slot game, and cause to be displayed 1210, on a button 810 separate from the dynamic button deck 806 and hybrid display area 808, a spin option. The gaming machine is further configured to receive 1212 user selection, at the hybrid display area 808, of a number of paylines to be wagered on in the slot game, and cause to be displayed 1214, on each button in the dynamic button deck 806, a new number of credits to be wagered in the slot game in accordance with the user selected number of paylines. The gaming machine is yet further configured to receive 1216 user selection of a number of credits to be wagered in the slot game, receive 1218 user selection of the spin option, and initiate 1220 play of the slot game, in accordance with the user selected number of paylines and credits.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
at least one memory with instructions stored thereon; and
at least one processor in communication with the at least one memory, wherein execution of the instructions causes the at least one processor to:
receive an input associated with an electronic game of a plurality of electronic games;
display a first plurality of game aspects for the electronic game in a hybrid display area of at least one display device, wherein the at least one display device comprises the hybrid display area and a button deck display area comprising a plurality of buttons; and
display a second plurality of game aspects for the electronic game in the button deck display area, wherein the second plurality of game aspects are different from the first plurality of game aspects and are associated with the first plurality of game aspects.

2. The electronic gaming device of claim 1, wherein the electronic game comprises a virtual playing card game, the first plurality of game aspects comprises at least one virtual playing card, and the second plurality of game aspects comprises at least one of a hold option or a cancel option.

3. The electronic gaming device of claim 1, wherein the instructions further cause the at least one processor to receive a second input associated with a second electronic game of the plurality of electronic games.

4. The electronic gaming device of claim 3, wherein the instructions further cause the at least one processor to:
display a third plurality of game aspects in the hybrid display area, wherein the third plurality of game aspects are associated with the second electronic game; and
display a fourth plurality of game aspects in the button deck display area, wherein the fourth plurality of game aspects are associated with the second electronic game, different from the third plurality of game aspects, and are associated with the third plurality of game aspects.

5. The electronic gaming device of claim 1, wherein the instructions further cause the at least one processor to display at least one of the first plurality of game aspects or the second plurality of game aspects based on at least one message received from a server.

6. The electronic gaming device of claim 1, wherein the instructions further cause the at least one processor to transmit an input message associated with the input to a server.

7. At least one non-transitory computer-readable storage medium with instructions stored thereon that, in response to execution by at least one processor, cause the at least one processor to:
receive an input associated with an electronic game of a plurality of electronic games;
cause display of a first plurality of game aspects for the electronic game in a hybrid display area of at least one display device of a gaming device, wherein the at least one display device comprises the hybrid display area and a button deck display area comprising a plurality of buttons; and
cause display of a second plurality of game aspects for the electronic game in the button deck display area, wherein the second plurality of game aspects are different from the first plurality of game aspects and are associated with the first plurality of game aspects.

8. The at least one non-transitory computer-readable storage medium of claim 7, wherein the electronic game comprises a virtual playing card game, the first plurality of game aspects comprises at least one virtual playing card, and the second plurality of game aspects comprises at least one of a hold option or a cancel option.

9. The at least one non-transitory computer-readable storage medium of claim 7, wherein the instructions further cause the at least one processor to receive a second input associated with a second electronic game of the plurality of electronic games.

10. The at least one non-transitory computer-readable storage medium of claim 9, wherein the instructions further cause the at least one processor to:
cause display of a third plurality of game aspects in the hybrid display area, wherein the third plurality of game aspects are associated with the second electronic game; and
cause display of a fourth plurality of game aspects in the button deck display area, wherein the fourth plurality of game aspects are associated with the second electronic game, different from the third plurality of game aspects, and are associated with the third plurality of game aspects.

11. The at least one non-transitory computer-readable storage medium of claim 7, wherein the instructions further cause the at least one processor to cause display of at least one of the first plurality of game aspects or the second plurality of game aspects by transmitting at least one message to the gaming device.

12. The at least one non-transitory computer-readable storage medium of claim 7, wherein the instructions further cause the at least one processor to receive an input message associated with the input from the gaming device.

13. A method of electronic gaming implemented by at least one processor in communication with at least one memory, the method comprising:

receiving an input associated with an electronic game of a plurality of electronic games;

causing a first plurality of game aspects for the electronic game to be displayed in a hybrid display area of at least one display device of a gaming device, wherein the at least one display device comprises the hybrid display area and a button deck display area comprising a plurality of buttons; and causing a second plurality of game aspects for the electronic game to be displayed in the button deck display area, wherein the second plurality of game aspects are different from the first plurality of game aspects and are associated with the first plurality of game aspects.

14. The method of claim 13, wherein the electronic game comprises a virtual playing card game, the first plurality of game aspects comprises at least one virtual playing card, and the second plurality of game aspects comprises at least one of a hold option or a cancel option.

15. The method of claim 13, further comprising causing at least one of the first plurality of game aspects or the second plurality of game aspects to be displayed by transmitting at least one message to the gaming device.

16. The method of claim 13, further comprising causing at least one of the first plurality of game aspects or the second plurality of game aspects to be displayed based on at least one message received from a server.

17. The method of claim 13, further comprising transmitting an input message associated with the input to a server.

* * * * *